US007488047B2

(12) United States Patent
Hatano et al.

(10) Patent No.: US 7,488,047 B2
(45) Date of Patent: Feb. 10, 2009

(54) BRAKE SYSTEM

(75) Inventors: Kunimichi Hatano, Wako (JP); Hiromi Inagaki, Wako (JP); Osamu Yamamoto, Wako (JP); Takehiro Horiuchi, Wako (JP); Nobuyuki Ishii, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 563 days.

(21) Appl. No.: 11/252,187

(22) Filed: Oct. 17, 2005

(65) Prior Publication Data

US 2006/0082217 A1     Apr. 20, 2006

(30) Foreign Application Priority Data

Oct. 18, 2004    (JP)   ............................. 2004-302497

(51) Int. Cl.
     *B60T 8/88*      (2006.01)
(52) U.S. Cl. ................................. 303/122.09
(58) Field of Classification Search ............... 303/11, 303/122.03–122.14, 113.4
See application file for complete search history.

(56) References Cited

U.S. PATENT DOCUMENTS

| 5,273,348 | A | * | 12/1993 | Yagi et al. ...................... 303/13 |
| 5,941,608 | A | * | 8/1999 | Campau et al. .......... 303/113.4 |
| 6,123,397 | A | * | 9/2000 | Ohtomo et al. ........ 303/122.05 |
| 6,913,326 | B1 | * | 7/2005 | Ohkubo et al. ................. 303/11 |
| 7,014,277 | B2 | * | 3/2006 | Soga ........................... 303/122 |
| 2006/0091726 | A1 | * | 5/2006 | Hatano et al. .......... 303/122.13 |
| 2007/0182244 | A1 | * | 8/2007 | Hatano .................... 303/116.1 |
| 2007/0216218 | A1 | * | 9/2007 | Matsushita et al. ............ 303/20 |

FOREIGN PATENT DOCUMENTS

JP      04-362454      12/1992

OTHER PUBLICATIONS

Corresponds to Japanese Patent Pub. No. 3205570.

* cited by examiner

*Primary Examiner*—Christopher P Schwartz
(74) *Attorney, Agent, or Firm*—Carrier, Blackman & Associates, P.C.; Joseph P. Carrier; William D. Blackman

(57) ABSTRACT

During normal operation in which a motor cylinder is operative, when a depressing force cut-off valve is closed, a front wheel is braked by operating a first wheel cylinder by brake fluid pressure generated by the motor cylinder. When there is an abnormality in which the motor cylinder breaks down, the front wheel is braked by supplying, via the opened depressing force cut-off valve, brake fluid pressure generated by a master cylinder operated by a driver's braking operation to the first wheel cylinder, and a rear wheel is braked by supplying the brake fluid pressure to a second wheel cylinder. Thus, since both the front and rear wheels are braked by the brake fluid pressure generated by the master cylinder in case of abnormality, a vehicle can be reliably stopped by a sufficient braking force.

6 Claims, 10 Drawing Sheets

WHEN NORMAL

WHEN ABNORMAL

WHEN NORMAL

WHEN ABNORMAL

WHEN NORMAL

WHEN ABNORMAL

WHEN NORMAL

WHEN ABNORMAL

WHEN NORMAL

WHEN ABNORMAL

BRAKE SYSTEM

CROSS-REFERENCE TO RELATED APPLICATIONS

The present invention claims priority under 35 USC 119 based on Japanese patent application No. 2004-302497, filed on Oct. 18, 2004. The subject matter of this priority document is incorporated in its entirety by reference herein.

BACKGROUND OF THE INVENTION

1. Field of the Invention

The present invention relates to a brake system in which during normal operation a wheel is braked by electric braking device. When there is an abnormality in which the electric braking device becomes inoperative, a wheel is braked using brake fluid pressure generated by a master cylinder actuated by a driver's braking operation.

2. Description of the Related Art

A so-called brake-by-wire type brake system is known from Japanese Patent Publication No. 3205570 in which, during normal operation, an electrically operated fluid pressure outputting device for generating brake fluid pressure is operative. A disk brake system for braking a wheel is actuated by brake fluid pressure generated by the electrically operated fluid pressure outputting device when communication between the disk brake system and a master cylinder that generates brake fluid pressure by a driver depressing a brake pedal is cut off by means of a fail-safe solenoid switch valve. When there is an abnormality in which the electrically operated fluid pressure outputting device becomes inoperative, the fail-safe solenoid switch valve is opened, and the disk brake system is actuated by brake fluid pressure generated by the master cylinder.

When an electric system breaks down to cause an abnormality in which the brake-by-wire type brake system is inoperative, it is desirable that a braking force is reliably generated at a level comparable with normal operation to avoid an emergency situation. However, in the above-mentioned conventional arrangement, since in case of an abnormality only a disk brake system of a front wheel is operated by brake fluid pressure generated by the master cylinder, and a disk brake system of a rear wheel does not operate, the level of generated braking force is not necessarily sufficient when there is an abnormality.

SUMMARY OF THE INVENTION

The present invention has been accomplished under the above-mentioned circumstances. It is an object thereof to enable generation of a braking force at a level comparable with normal operation by brake fluid pressure generated by a driver's braking operation when there is an abnormality in which a brake-by-wire type brake system becomes inoperative.

In order to achieve the above-mentioned object, according to the present invention, a brake system is provided. The brake system includes a master cylinder that generates brake fluid pressure by a driver's braking operation, and a first wheel cylinder that is provided on one of a front wheel and a rear wheel and can brake the wheel. The brake system also includes a second wheel cylinder provided on the other of the front wheel and the rear wheel that can brake the wheel, a first fluid passage that provides a connection between the master cylinder and the first wheel cylinder, and a first cut-off valve provided in the first fluid passage. A brake fluid pressure generating device is provided in the first fluid passage on the first wheel cylinder side relative to the first cut-off valve. A second fluid passage that branches off from between the first cut-off valve and the brake fluid pressure generating device communicates with a reservoir, and a second cut-off valve is disposed in the second fluid passage. Also provided are a cut-off member that cuts off communication between the first wheel cylinder and the reservoir when the brake fluid pressure generating device operates, and a third fluid passage that permits the second wheel cylinder to communicate with a section of the passage between the cut-off member and the second cut-off valve.

A depressing force cut-off valve 19 of embodiments corresponds to the first cut-off valve of the present invention, an atmosphere cut-off valve 32 of the embodiments corresponds to the second cut-off valve of the present invention, a motor cylinder 20 and a fluid pressure pump 46 of the embodiments correspond to the brake fluid pressure generating device of the present invention, and a piston 21 and a second open/close valve 50 of the embodiments correspond to the cut-off member of the present invention.

With the arrangement of the present invention, during normal operation in which the brake fluid pressure generating device is operative, when the first cut-off valve is closed so as to cut off communication between the master cylinder and the first wheel cylinder, one of the front wheel and the rear wheel can be braked by operating the first wheel cylinder using the brake fluid pressure generated by the brake fluid pressure generating device. In this process, since the cut-off member cuts off the communication between the first wheel cylinder and the reservoir, the brake fluid pressure generated by the brake fluid pressure generating device is prevented from escaping to the reservoir via the second fluid passage.

When there is an abnormality in which the brake fluid pressure generating device breaks down, brake fluid pressure generated by the master cylinder operated by the driver's braking operation is supplied to the first wheel cylinder via the first fluid passage to brake one of the wheels. At the same time, the brake fluid pressure is supplied to the second wheel cylinder via the third fluid passage to brake the other wheel. In this process, since the second cut-off valve is closed so as to block the second fluid passage communicating with the reservoir, the brake fluid pressure generated by the master cylinder can be prevented from escaping to the reservoir.

As described above, when there is an abnormality in which the brake fluid pressure generating device breaks down, both the front and rear wheels can be braked by the brake fluid pressure generated by the master cylinder operated by the driver's braking operation. Therefore, it is possible to generate a sufficient braking force in case of abnormality, thereby reliably stopping the vehicle.

The above-mentioned object, other objects, characteristics, and advantages of the present invention will become apparent from an explanation of preferred embodiments that will be described in detail below by reference to the attached drawings.

DETAILED DESCRIPTION OF THE INVENTION

Figure 1:
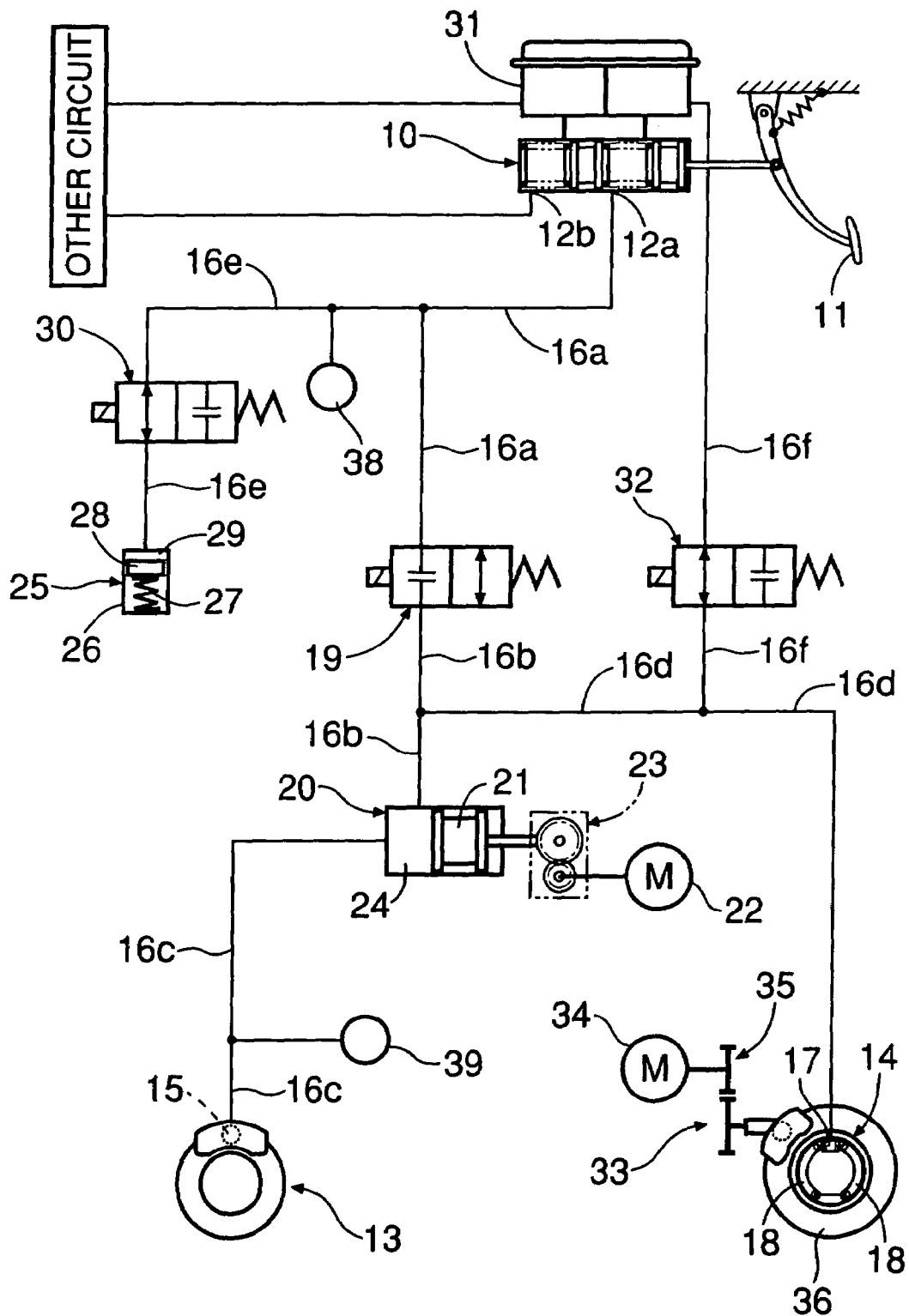
FIG. 1 is a fluid pressure schematic diagram of a vehicular brake system of a first embodiment during normal operation.
Figure 2:
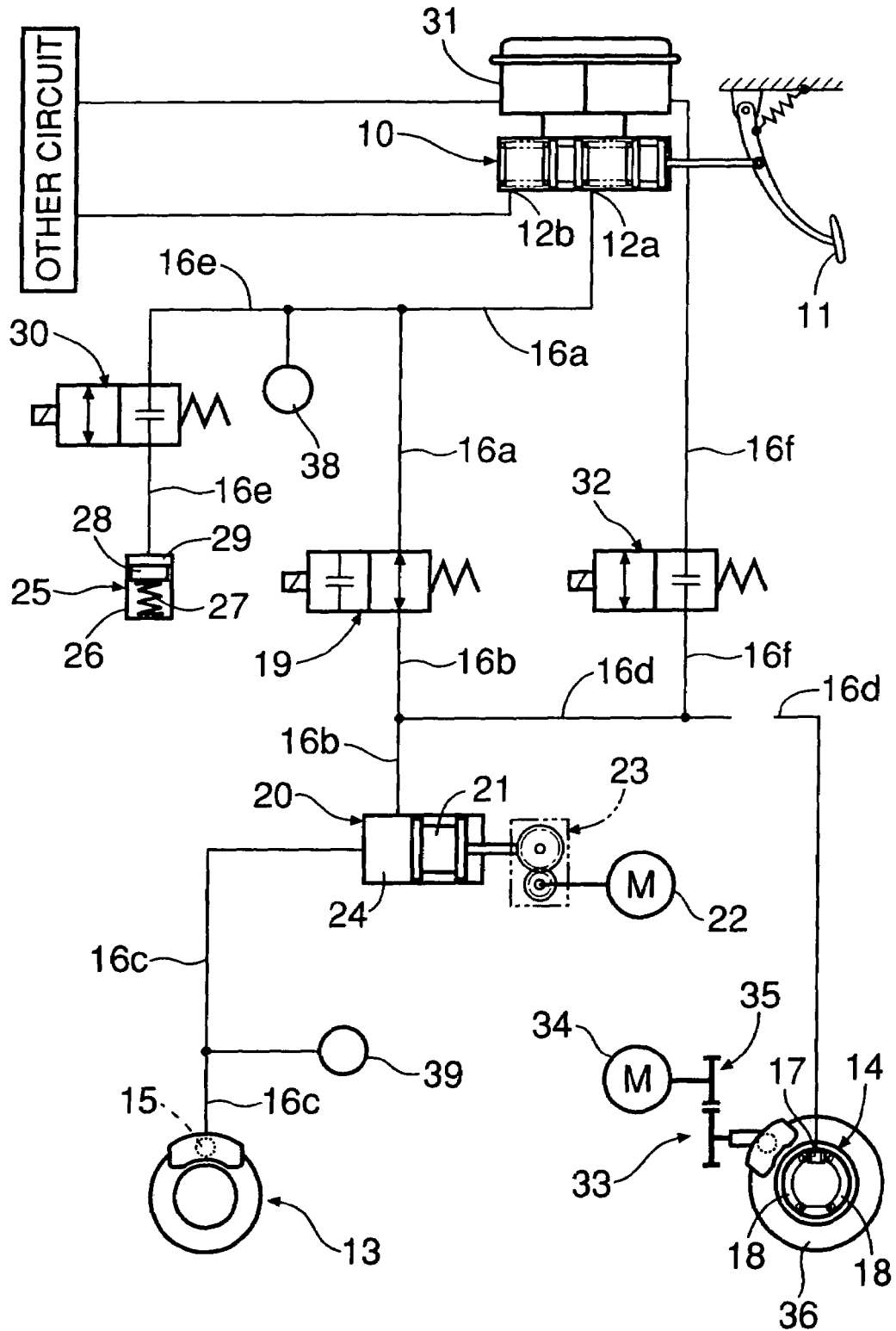
FIG. 2 is the fluid pressure schematic diagram FIG. 1 corresponding to a case in which an abnormality occurs.

FIG. 1 and FIG. 2 show a first embodiment of the present invention. As shown in FIG. 1, a tandem master cylinder 10 includes first and second output ports 12a and 12b for outputting a brake fluid pressure corresponding to a depressing force with which a driver depresses a brake pedal 11. The first output port 12a is connected to, for example, a disk brake system 13 of a front left wheel and a drum brake system 14 of a rear right wheel. The second output port 12b is connected to, for example, a disk brake system of a front right wheel and a drum brake system of a rear left wheel. FIG. 1 shows only one brake circuit connected to the first output port 12a, and the other brake circuit connected to the second output port 12b is not illustrated, but the structures of both brake circuits are substantially the same. The brake circuit connected to the first output port 12a is explained below.

The first output port 12a of the master cylinder 10 and a first wheel cylinder 15 of the disk brake system 13 of the front wheel are connected via fluid passages 16a, 16b and 16c, which cooperate to define a first fluid passage. A fluid passage 16d branching from the fluid passage 16b is connected to a second wheel cylinder 17 of the drum brake system 14 of the rear wheel. The drum brake system 14 brakes the rear wheel by device of a pair of brake shoes 18 that are operated by the second wheel cylinder 17.

Disposed between the fluid passage 16a and the fluid passage 16b is a depressing force cut-off valve 19 which is a normally open type solenoid valve. A motor cylinder 20 is disposed between the fluid passage 16b and the fluid passage 16c. A piston 21 is slidably fitted in the motor cylinder 20, and driven by an electric motor 22 via a speed reduction mechanism 23 to generate a brake fluid pressure in a fluid chamber 24 formed on a front face of the piston 21. When moved outwardly in the motor cylinder 20, the piston 21 functions as a cut-off member to block fluid flow between fluid passage 16b and fluid passage 16c, temporarily interrupting fluid communication between the first wheel cylinder 15 and the reservoir 31.

A stroke simulator 25 is connected to the downstream end of a fluid passage 16e that branches from a middle section of the fluid passage 16a. The stroke simulator 25 has a piston 28 slidably fitted in a cylinder 26, the piston 28 being biased by a spring 27. A fluid chamber 29 is formed on the side of the piston 28 opposite to the spring 27, and communicates with the fluid passage 16e. A simulator cut-off valve 30, which is a normally closed solenoid valve, is disposed in a middle section of the fluid passage 16e. A fluid passage 16f branches from a middle section of the fluid passage 16d, and communicates with a reservoir 31 of the master cylinder 10. Fluid passage 16f cooperates with an upstream portion of passage 16d to provide a second fluid passage that branches off from the first fluid passage (16a, 16b and 16c) at a location between the depressing force cut-off valve 19 and the motor cylinder 20 (first brake fluid pressure generating device), and communicates with the reservoir 31. The other (downstream) part of fluid passage 16d provides a third fluid passage that permits the second wheel cylinder 17 to communicate with a passage between the piston 21 (cut-off member) and an atmosphere cut-off valve 32. The atmosphere cut-off valve 32, which is a normally closed solenoid valve, is disposed in a middle section of the fluid passage 16f.

The rear wheel is provided with an electric braking device 33 in addition to the drum brake system 14. The electric braking device 33 transmits the driving force of an electric motor 34 directly to brake pads via a reduction mechanism 35 (that is, not employing brake fluid pressure), and the brake pads sandwich a brake disk 36 to brake the rear wheel.

A fluid pressure sensor 38 for detecting a fluid pressure of the fluid passage 16e (or the fluid passage 16a) and a fluid pressure sensor 39 for detecting a fluid pressure of the fluid passage 16c are connected to an electronic control unit (not illustrated). The electronic control unit controls the operation of the depressing force cut-off valve 19, the simulator cut-off valve 30, the atmosphere cut-off valve 32, the electric motor 22 of the motor cylinder 20, and the electric motor 34 of the electric braking device 33.

The operation of the first embodiment of the present invention having the above-mentioned arrangement is now explained with reference to FIGS. 1 and 2.

During normal operation (FIG. 1), the solenoids of the depressing force cut-off valve 19, the simulator cut-off valve 30 and the atmosphere cut-off valve 32 are energized by commands from the electronic control unit. As a result, the depressing force cut-off valve 19 closes so as to cut off communication between the master cylinder 10 and the disk brake system 13, the simulator cut-off valve 30 opens so as to provide communication between the master cylinder 10 and the stroke simulator 25, and the atmosphere cut-off valve 32 opens. In this state, when the driver depresses the brake pedal 11 so as to make the master cylinder 10 generate a brake fluid pressure, the fluid pressure sensor 38 detects a fluid pressure of the fluid passage 16a (or the fluid passage 16e) which is blocked by the depressing force cut-off valve 19. The electronic control unit operates the electric motor 22 so as to generate the same fluid pressure in the fluid passage 16c as the fluid pressure detected by the fluid pressure sensor 38.

As a result, the driving force of the electric motor 22 is transmitted to the piston 21 via the reduction mechanism 23, and a brake fluid pressure generated in the fluid chamber 24 of the motor cylinder 20 is transmitted to the first wheel cylinder 15 of the disk brake system 13 via the fluid passage 16c, thereby braking the front wheel. In this process, the fluid pressure of the fluid passage 16c is detected by the fluid pressure sensor 39, and the electronic control unit feedback-controls the operation of the electric motor 22 so that this fluid pressure coincides with the fluid pressure detected by the fluid pressure sensor 38 of the fluid passage 16e.

When the piston 21 of the motor cylinder 20 is moved slightly forward by the electric motor 22, communication between the fluid chamber 24 and the fluid passage 16b is cut off. Therefore, there is no possibility of the brake fluid pressure generated by the motor cylinder 20 escaping to the reservoir 31 via the atmosphere cut-off valve 32 provided in the fluid passage 16f.

During the above-mentioned normal operation, since the depressing force cut-off valve 19 is held in a closed state unless an abnormal state such as breakdown of a power source occurs, there are conventional problems that occur. In particular, if the brake pads of the disk brake system 13 are worn and the volume of the fluid passage 16*c* between the motor cylinder 20 and the disk brake system 13 increases, an amount of brake fluid corresponding to the increase cannot be replenished from the reservoir 31, and moreover drag of the first wheel cylinder 15 cannot be reduced.

However, in this embodiment, when the piston 21 of the motor cylinder 20 retreats, the fluid chamber 24 communicates with the reservoir 31 via the opened atmosphere cut-off valve 32, any shortfall in the brake fluid that due to the worn brake pads of the disk brake system 13 can be replenished from the reservoir 31, and drag of the first wheel cylinder 15 when the braking force is released can be reduced.

Furthermore, during normal operation in which the driver depresses the brake pedal 11 and the master cylinder 10 generates a brake fluid pressure, the brake fluid pressure is transmitted to the fluid chamber 29 of the stroke simulator 25. As a consequence, the piston 28 moves against the elastic force of the spring 27, thereby generating a reaction force against the depression of the brake pedal 11. This can provide an operational feeling similar to that given when the disk brake system 13 is operated by a driver's depressing force, although the disk brake system 13 is actually operated by the driving force of the electric motor 22.

As described above, while the disk brake system 13 brakes the front wheel, the electric motor 34 of the electric braking system 33 is operated by a command from the electronic control unit, the driving force of the electric motor 34 is transmitted to the brake pads via the reduction mechanism 35, and the brake pads sandwich the brake disk 36 so as to brake the rear wheel. As a result, the front wheel is braked by brake fluid pressure generated by the driving force of the electric motor 22, and the rear wheel is braked directly by the driving force of the electric motor 34.

When there is an abnormality in brake operation such as breakdown of the power source caused by detachment of a battery, etc., the depressing force cut-off valve 19 opens so as to provide communication between the master cylinder 10 and the disk brake system 13; the simulator cut-off valve 30 closes so as to cut off communication between the master cylinder 10 and the stroke simulator 25; and the atmosphere cut-off valve 32 closes so as to cut off communication between the master cylinder 10 and the reservoir 31, as shown in FIG. 2. As a result, the brake fluid pressure generated by the master cylinder 10 operated by the driver depressing the brake pedal 11 is transmitted to the first wheel cylinder 15 of the disk brake system 13 via the fluid passage 16*a*, the opened depressing force cut-off valve 19, the fluid passage 16*b*, and the fluid passage 16*c*, thus braking the front wheel.

Concurrently, the brake fluid pressure generated by the master cylinder 10 is transmitted to the second wheel cylinder 17 of the drum brake system 14 via the fluid passage 16*a*, the opened depressing force cut-off valve 19, the fluid passage 16*b* and the fluid passage 16*d*, thus braking the rear wheel. Furthermore, since communication between the stroke simulator 25 and the master cylinder 10 is cut off by the simulator cut-off valve 30 being closed, the stroke simulator 25 stops functioning. As a result, it is possible to prevent the driver from having an uncomfortable sensation due to the stroke of the brake pedal 11 unnecessarily increasing. Moreover, the brake fluid pressure generated by the master cylinder 10 is transmitted to the first and second wheel cylinders 15 and 17 at the front and rear without being absorbed by the stroke simulator 25, thus generating a braking force with high responsiveness.

Even if the electric power source breaks down and the depressing force cut-off valve 19, the simulator cut-off valve 30, the atmosphere cut-off valve 32, and the electric motors 22 and 34 become inoperative, the first and second wheel cylinders 15 and 17 of the front wheel and the rear wheel can be operated without any problem by device of the brake fluid pressure generated by the master cylinder 10 operated by the driver depressing the brake pedal 11, so that not only the front wheel but also the rear wheel can be braked in case of abnormality, thereby more safely stopping the vehicle.

In general, a disk brake system has the characteristics that its heat dissipating properties are good and its performance is difficult to be degraded in continuous operation. A drum brake system has the characteristics that it has a self-servo function and the braking function is high, but its heat dissipating properties are poor. Therefore, as a brake system for use during normal operation, the disk brake system is considered to be superior, and in order to generate a large braking force temporarily in case of emergency, the drum brake system is considered to be superior.

In this embodiment, since the rear wheel, which has a high braking function in the case of an abnormality, is braked by the drum brake system 14, the vehicle can be more safely stopped as compared with a case where the rear wheel is braked by the disk brake system 13.

Figure 3:
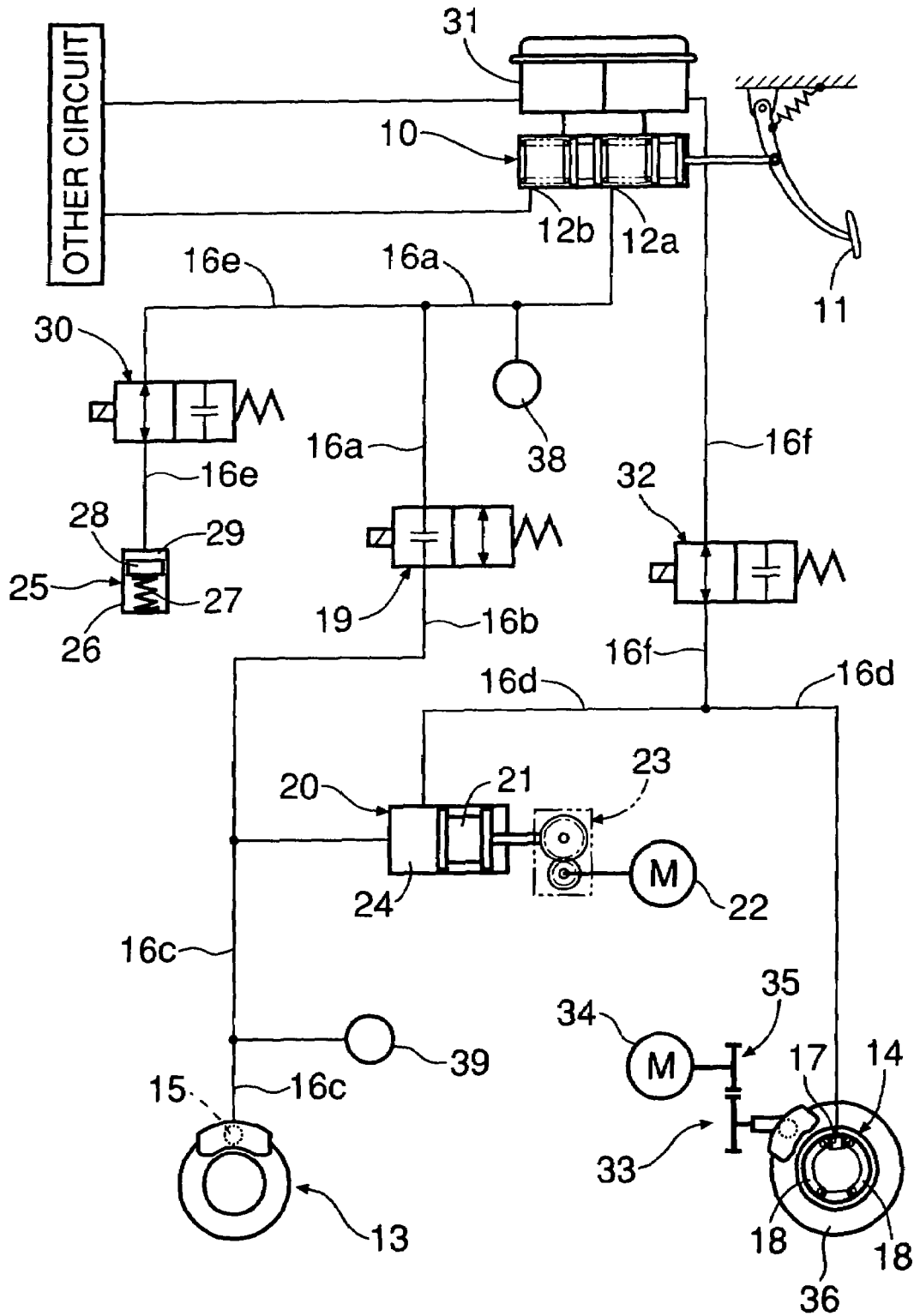
FIG. 3 is a fluid pressure schematic diagram of a vehicular brake system of a second embodiment during normal operation.
Figure 4:
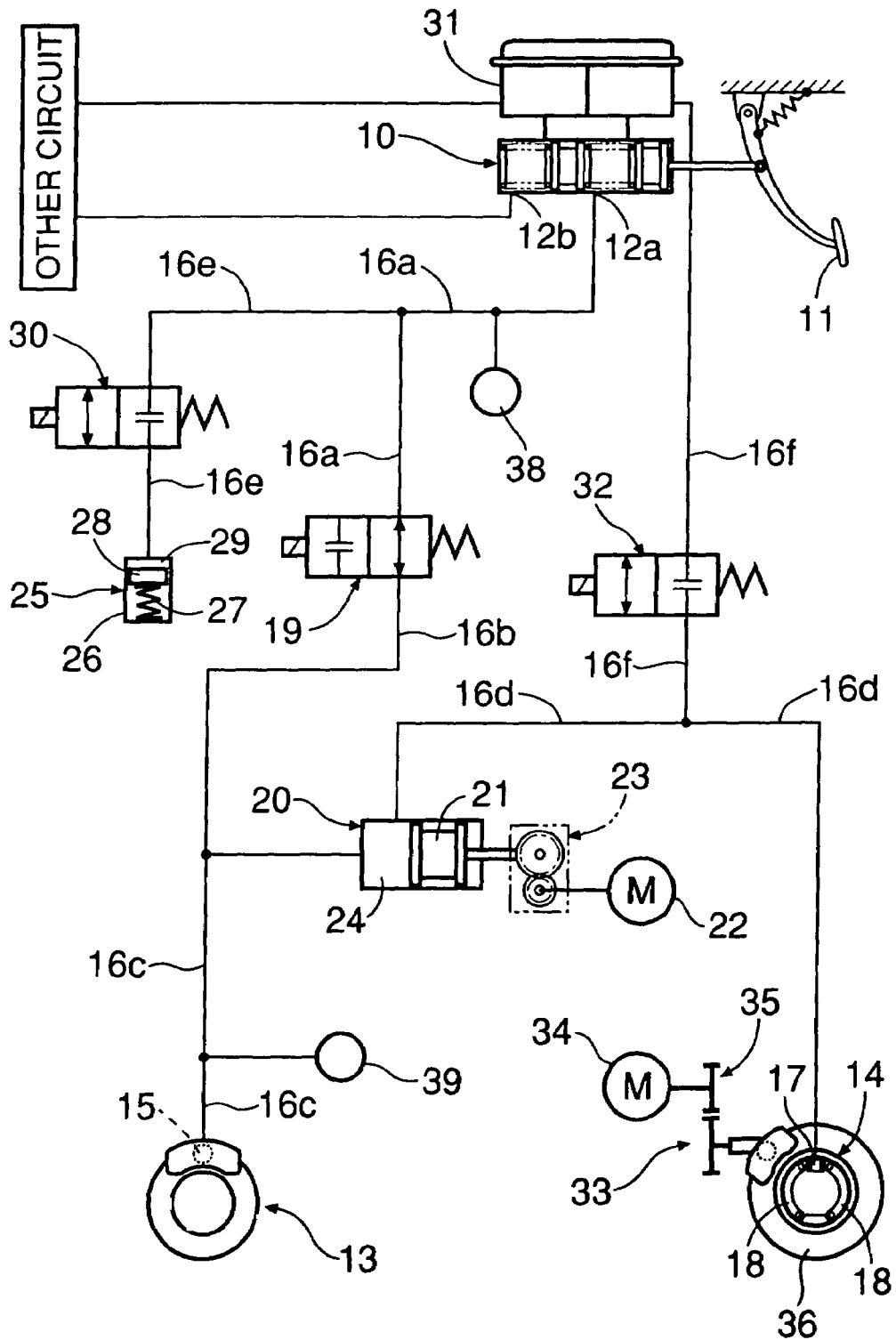
FIG. 4 is the fluid pressure schematic diagram FIG. 3 corresponding to a case in which an abnormality occurs.

A second embodiment of the present invention is now explained by reference to FIG. 3 and FIG. 4. In the second embodiment and embodiments thereafter, components corresponding to the components of the first embodiment are denoted by the same reference numerals and symbols, and duplication of the explanation is omitted.

The second embodiment is a modification of the first embodiment. Whereas in the first embodiment the fluid chamber 24 of the motor cylinder 20 is disposed between the fluid passages 16*b* and 16*c* that provide a connection between the master cylinder 10 and the disk brake system 13 of the front wheel, in the second embodiment fluid passages 16*b* and 16*c* communicate directly with each other, and these fluid passages 16*b* and 16*c* communicate with an output port of a fluid chamber 24 of a motor cylinder 20. Therefore, in the case of an abnormality shown in FIG. 4, when a disk brake system 13 of a front wheel is operated by brake fluid pressure generated by a master cylinder 10, in the first embodiment the brake fluid pressure is transmitted via the fluid chamber 24 of the motor cylinder 20, but in the second embodiment it is transmitted without passing through the fluid chamber 24 of the motor cylinder 20.

Also in the second embodiment, in the case of an abnormality in brake operation, not only the front wheel but also a rear wheel are braked by the brake fluid pressure generated by the master cylinder 10, thus reliably stopping the vehicle, and moreover, since a drum brake system 14 having a high braking function is employed for the rear wheel, the vehicle can be more reliably stopped.

Figure 5:
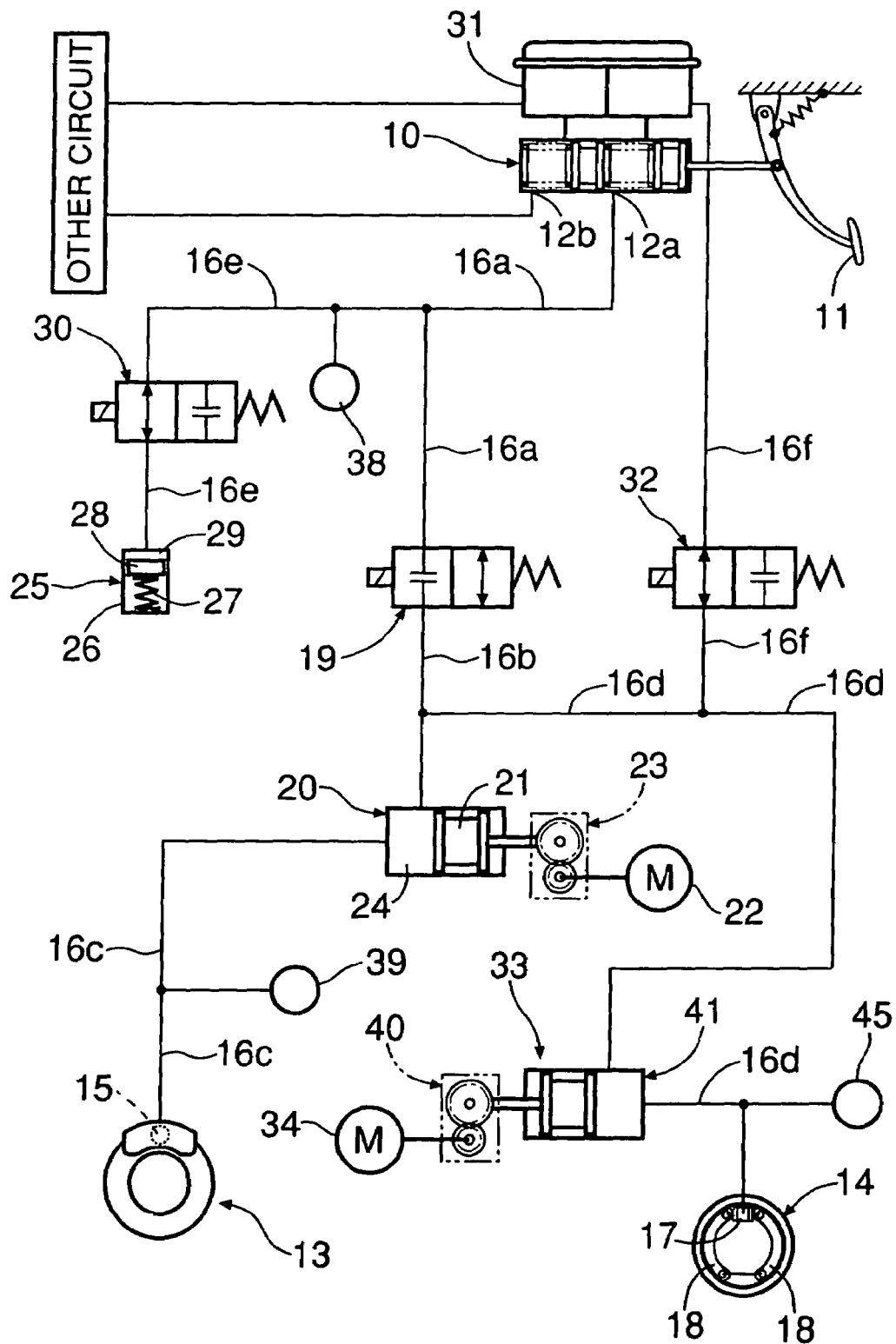
FIG. 5 is a fluid pressure schematic diagram of a vehicular brake system of a third embodiment during normal operation.

A third embodiment of the present invention is now explained by reference to FIG. 5 and FIG. 6.

The third embodiment is a modification of the first embodiment. Whereas in the first embodiment the electric braking device 33 of the rear wheel directly brakes the brake disk 36 by device of the driving force of the electric motor 34, in the third embodiment the second wheel cylinder 17 for driving brake shoes 18 of a drum brake system 14 is operated by brake fluid pressure generated by a motor cylinder 41 driven by an electric motor 34 via a reduction mechanism 40.

The electric motor 34 for driving the motor cylinder 41 of a rear wheel is controlled so that a fluid pressure detected by a fluid pressure sensor 45 coincides with a fluid pressure detected by a fluid pressure sensor 38.

Figure 6:
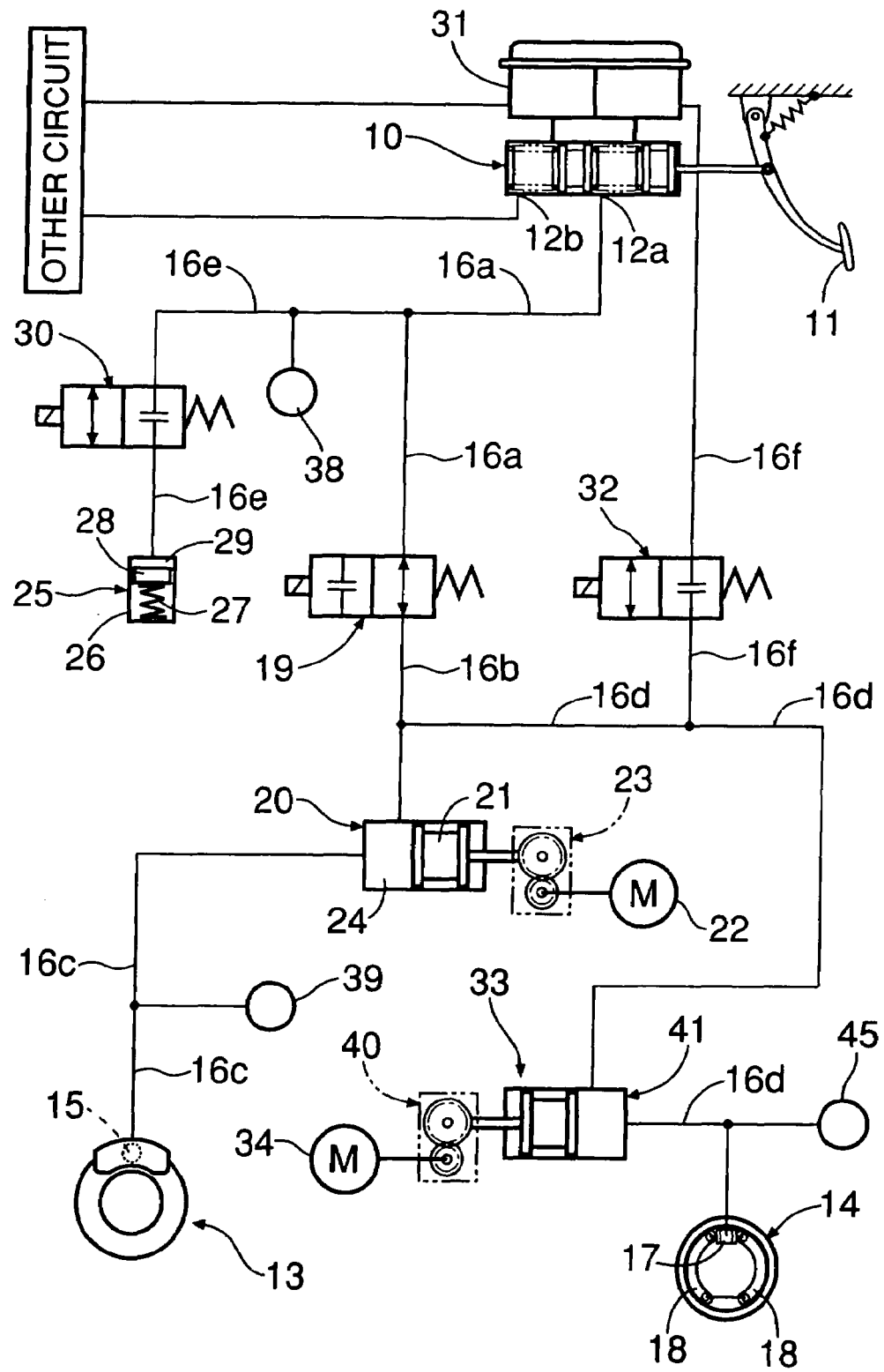
FIG. 6 is the fluid pressure schematic diagram FIG. 5 corresponding to a case in which an abnormality occurs.

Also in the third embodiment, in the case of an abnormality in brake operation shown in FIG. 6, not only a front wheel but also the rear wheel are braked by brake fluid pressure generated by a master cylinder 10, thus reliably stopping the vehicle, and moreover, since the drum brake system 14 having a high braking function is employed for the rear wheel, the vehicle can be more reliably stopped.

A fourth embodiment of the present invention is now explained by reference to FIG. 7 and FIG. 8.

The fourth embodiment is a modification of the first embodiment. In the fourth embodiment, a back chamber 42 housing a spring 27 of a stroke simulator 25 communicates via a fluid passage 16g with a branch section between fluid passages 16b and 16d.

Figure 7:
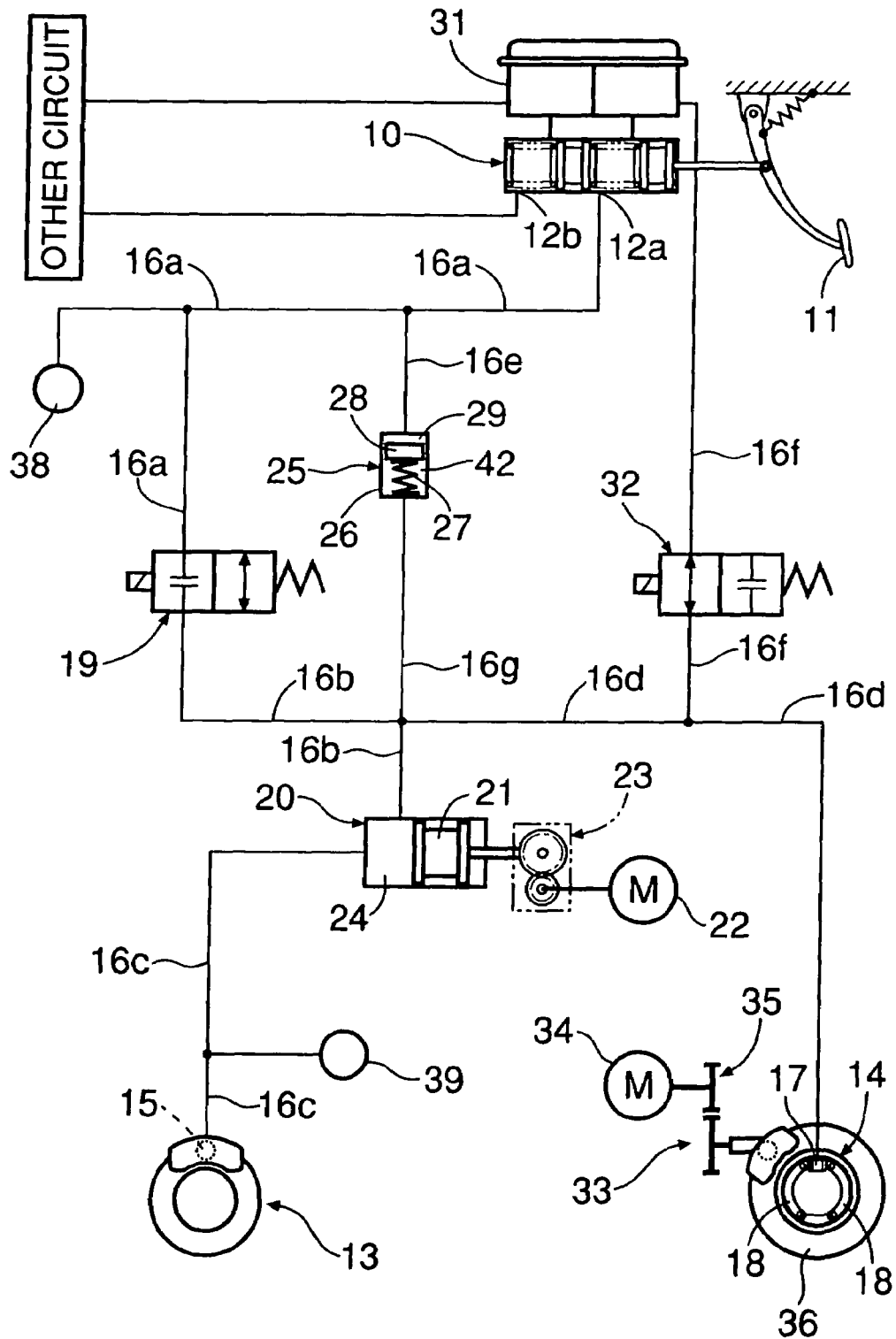
FIG. 7 is a fluid pressure schematic diagram of a vehicular brake system of a fourth embodiment during normal operation.

Therefore, during normal operation shown in FIG. 7, a disk brake system 13 of a front wheel is operated by brake fluid pressure generated by a motor cylinder 20 operated by an electric motor 22, and electric braking device 33 of a rear wheel is directly operated by a driving force generated by an electric motor 34, so that the vehicle can be braked. In this process, an atmosphere cut-off valve 32 opens so as to provide communication between a reservoir 31 and the back chamber 42 of the stroke simulator 25, brake fluid pressure transferred from a master cylinder 10 to a fluid chamber 29 moves a piston 28 against the resilient force of the spring 27, and brake fluid of the back chamber 42 escapes to the reservoir 31 via the atmosphere cut-off valve 32, thus enabling the stroke simulator 25 to exert its function.

Figure 8:
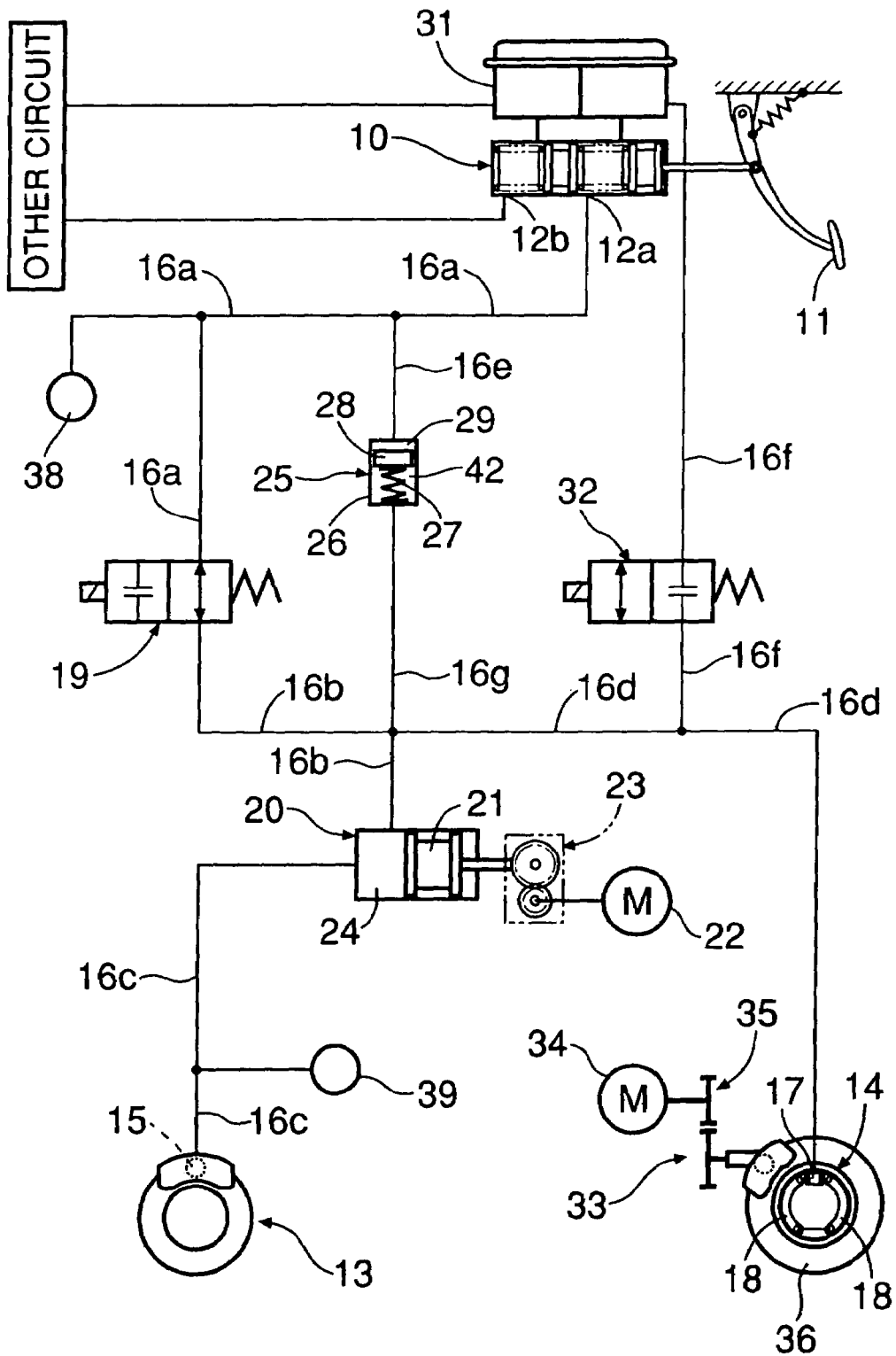
FIG. 8 is the fluid pressure schematic diagram FIG. 7 corresponding to a case in which an abnormality occurs.

When there is an abnormality in braking operation, as shown in FIG. 8, a depressing force cut-off valve 19 is opened, and the brake fluid pressure generated by the master cylinder 10 operates a disk brake system 13 of a front wheel and a drum brake system 14 of a rear wheel. In this process, since the brake fluid pressure from the master cylinder 10 is applied to both the fluid chamber 29 and the back chamber 42 of the stroke simulator 25, the piston 28 becomes immobile, and the stroke simulator 25 stops functioning. Therefore, it is possible to prevent the stroke of the brake pedal 11 from unnecessarily increasing, thereby preventing the braking feeling from being degraded.

Also in the fourth embodiment, in the case of an abnormality as shown in FIG. 8, not only the front wheel but also the rear wheel are braked by the brake fluid pressure generated by the master cylinder 10, thus reliably stopping the vehicle, and moreover, since the drum brake system 14 having a high braking function is employed for the rear wheel, the vehicle can be more reliably stopped.

A fifth embodiment of the present invention is now explained by reference to FIG. 9 and FIG. 10.

The fifth embodiment includes: a fluid pressure pump 46; an accumulator 47 for storing fluid pressure generated by the fluid pressure pump 46; a first open/close valve 48 disposed between the fluid pressure pump 46 and accumulator 47 and a disk brake system 13 of a front wheel; a second open/close valve 49 disposed between the fluid pressure pump 46 and the accumulator 47 and a drum brake system 14 of a rear wheel; a third open/close valve 50 as a cut-off member disposed in a fluid passage 16c in a position on the downstream side of the first open/close valve 48 and on the upstream side of the fluid pressure pump 46; and a fourth open/close valve 51 disposed in a fluid passage 16d in a position on the downstream side of the second open/close valve 49 and on the upstream side of the fluid pressure pump 46. A fluid passage 16f on the downstream side of an atmosphere cut-off valve 32 is connected to a reservoir 52.

The fluid pressure pump 46 may be a pump driven by an electric motor or a pump driven by an engine. The first and second open/close valves 48 and 49 provide a relief function whereby, if the pressure on the fluid pressure pump 46 and accumulator 47 side becomes excessive when they are closed, the fluid pressure escapes to the upstream side of the fluid pressure pump 46.

Figure 9:
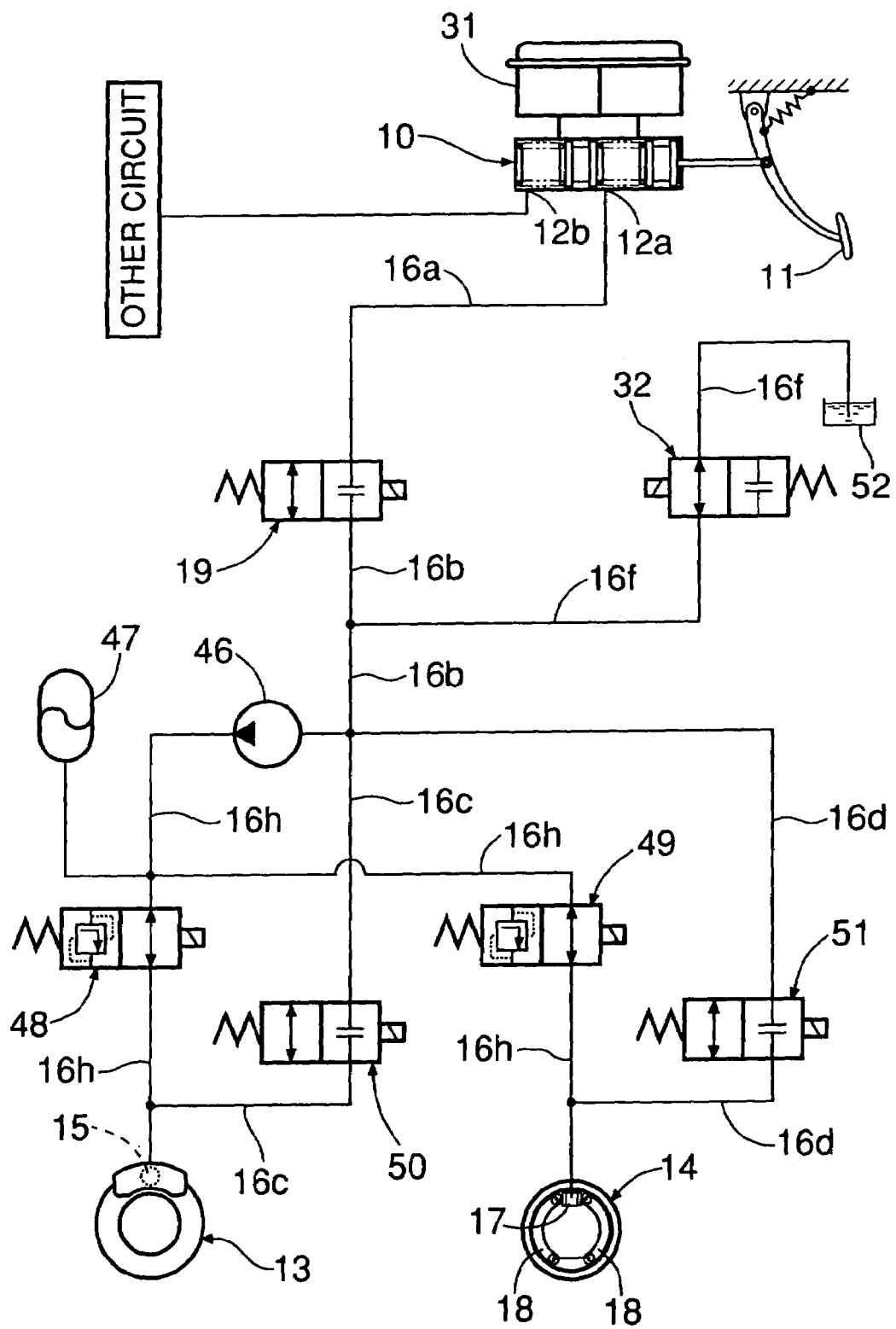
FIG. 9 is a fluid pressure schematic diagram of a vehicular brake system of a fifth embodiment during normal operation.

During normal operation in which the fluid pressure pump 46 exhibits its function, a depressing force cut-off valve 19 closes as shown in FIG. 9, the atmosphere cut-off valve 32 opens, the first and second open/close valves 48 and 49 open, and the third and fourth open/close valves 50 and 51 close. As a result, the brake fluid pressure generated by the master cylinder 10 operated by a driver's braking operation is cut off by the depressing force cut-off valve 19, and the brake fluid pressure generated by the fluid pressure pump 46 or the brake fluid pressure stored in the accumulator 47 operates the disk brake system 13 of the front wheel and the drum brake system 14 of the rear wheel via the first and second open/close valves 48 and 49 disposed in a fluid passage 16h.

Figure 10:
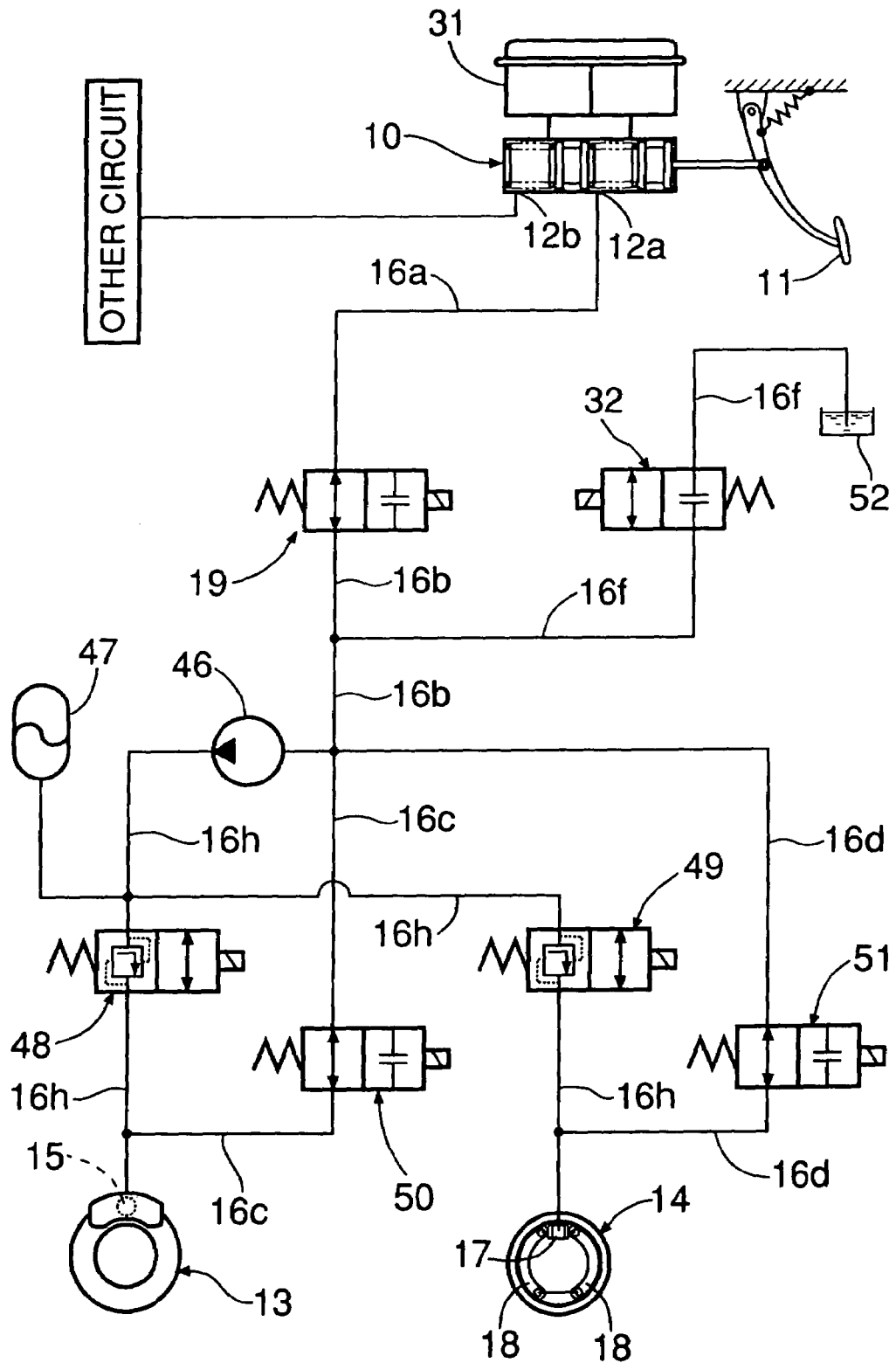
FIG. 10 is the fluid pressure schematic diagram FIG. 9 corresponding to a case in which an abnormality occurs.

When there is an abnormality in which the fluid pressure pump 46 does not function, the depressing force cut-off valve 19 opens as shown in FIG. 10, the atmosphere cut-off valve 32 closes, the first and second open/close valves 48 and 49 close, and the third and fourth open/close valves 50 and 51 open. As a result, the brake fluid pressure generated by the master cylinder 10 operated by a driver's braking operation operates the disk brake system 13 of the front wheel and the drum brake system 14 of the rear wheel via the depressing force cut-off valve 19 and the third and fourth open/close valves 50 and 51 disposed in fluid passages 16a to 16d. In this process, since the atmosphere cut-off valve 32 is closed, the brake fluid pressure generated by the master cylinder 10 does not escape to the reservoir 52.

Also in the fifth embodiment, in the case of an abnormality shown in FIG. 10, not only the front wheel but also the rear wheel are braked by the brake fluid pressure generated by the master cylinder 10, thus reliably stopping the vehicle.

In the fifth embodiment, the upstream side of the fluid pressure pump 46 may be connected to a reservoir that is cut off from the fluid passages 16b to 16d, instead of being connected to the fluid passages 16b to 16d.

Although embodiments of the present invention have been described above, the present invention is not limited thereto, and can be modified in a variety of ways without departing from the subject matter of the present invention.

What is claimed is:

1. A brake system comprising:
   a master cylinder that generates brake fluid pressure by a driver's braking operation;
   a first wheel cylinder that is provided on one of a front wheel and a rear wheel and can brake the wheel;
   a second wheel cylinder that is provided on the other of the front wheel and the rear wheel and can brake the wheel;
   a first fluid passage that provides a connection between the master cylinder and the first wheel cylinder;
   a first cut-off valve provided in the first fluid passage;
   a first brake fluid pressure generating device provided in the first fluid passage on the first wheel cylinder side relative to the first cut-off valve;
   a second fluid passage that branches off from the first fluid passage at a location between the first cut-off valve and the first brake fluid pressure generating device and communicates with a reservoir;
   a second cut-off valve provided in the second fluid passage;

a cut-off member that cuts off communication between the first wheel cylinder and the reservoir when the first brake fluid pressure generating device operates; and a third fluid passage that permits the second wheel cylinder to communicate with a passage between the cut-off member and the second cut-off valve.

2. The brake system of claim 1, the brake system further comprising a front wheel brake comprising a hydraulically actuated disk brake, and a rear wheel brake comprising an electrically actuated disk brake and a hydraulically actuated drum brake, wherein during normal operation of the brake system, the front wheel is braked by means of the hydraulically actuated disk brake and the rear wheel is braked by means of the electrically actuated disk brake, and during abnormal operation of the brake system, the front wheel is braked by means of the hydraulically actuated disk brake, and the rear wheel is braked by means of the hydraulically actuated drum brake.

3. The brake system of claim 1, the brake system further comprising a fluid pressure sensor disposed between the master cylinder and the first cut-off valve, a front wheel brake comprising a hydraulically actuated disk brake, and a rear wheel brake comprising an electrically actuated disk brake and a hydraulically actuated drum brake, wherein during normal operation of the brake system, the front wheel is braked by means of the hydraulically actuated disk brake and the rear wheel is braked by means of the electrically actuated disk brake, the front and rear brakes controlled to be braked at a pressure substantially the same as that sensed by the fluid pressure sensor, and during abnormal operation of the brake system, the front wheel is braked by means of the hydraulically actuated disk brake, and the rear wheel is braked by means of the hydraulically actuated drum brake.

4. The brake system of claim 1, the brake system further comprising a fluid pressure sensor disposed between the master cylinder and the first cut-off valve, wherein during normal operation of the brake system, the front wheel is braked by fluid pressure generated by the first brake fluid pressure generating device at a pressure substantially the same as that sensed by the fluid pressure sensor, and the rear wheel is braked by an electrically actuated disk brake, and during abnormal operation of the brake system, both the front wheel and the rear wheel are braked by fluid pressure generated by the master cylinder.

5. The brake system of claim 1, the brake system further comprising a front wheel brake comprising a hydraulically actuated disk brake, a rear wheel brake comprising a hydraulically actuated drum brake, a second brake fluid pressure generating device provided in the third fluid passage, and a fluid pressure sensor disposed between the master cylinder and the first cut-off valve, wherein during normal and abnormal operation of the brake system, the front wheel is braked by fluid pressure generated by the first brake fluid pressure generating device at a pressure substantially the same as that sensed by the first fluid pressure sensor, and the rear wheel is braked by fluid pressure generated by the second brake fluid pressure generating device at a pressure substantially the same as that sensed by the first fluid pressure sensor, and during abnormal operation of the brake system, both the front wheel and the rear wheel are braked by fluid pressure generated by the master cylinder.

6. The brake system of claim 1, the brake system further comprising a front wheel brake comprising a hydraulically actuated disk brake, a rear wheel brake comprising a hydraulically actuated drum brake, during normal operation of the brake system, the front wheel and the rear wheel are braked by fluid pressure generated by the first brake fluid pressure generating device, and during abnormal operation of the brake system, both the front wheel and the rear wheel are braked by fluid pressure generated by the master cylinder.

* * * * *